United States Patent
Sun et al.

(10) Patent No.: US 10,296,116 B2
(45) Date of Patent: May 21, 2019

(54) TOUCH DISPLAY DEVICE

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventors: Wen Sun, Beijing (CN); Nan Lu, Beijing (CN); Lina Liu, Beijing (CN); Yanmin Feng, Beijing (CN); Guangjun Zhang, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

( * ) Notice: Subject to any disclaimer, the term of this patent is extended or adjusted under 35 U.S.C. 154(b) by 0 days.

(21) Appl. No.: 15/113,216

(22) PCT Filed: Sep. 29, 2015

(86) PCT No.: PCT/CN2015/091034
§ 371 (c)(1),
(2) Date: Jul. 21, 2016

(87) PCT Pub. No.: WO2016/206222
PCT Pub. Date: Dec. 29, 2016

(65) Prior Publication Data
US 2017/0147113 A1 May 25, 2017

(30) Foreign Application Priority Data

Jun. 26, 2015 (CN) .................... 2015 2 0451318 U

(51) Int. Cl.
*G06F 3/044* (2006.01)
*G06F 3/041* (2006.01)

(52) U.S. Cl.
CPC ............ *G06F 3/0412* (2013.01); *G06F 3/044* (2013.01); *G06F 2203/04111* (2013.01)

(58) Field of Classification Search
CPC .................. G06F 3/044; G06F 3/0412; G06F 2203/04111
(Continued)

(56) References Cited

U.S. PATENT DOCUMENTS

2012/0194474 A1* 8/2012 Chang ..................... G06F 3/044
345/174
2014/0333582 A1* 11/2014 Huo ..................... G02F 1/13338
345/174
(Continued)

FOREIGN PATENT DOCUMENTS

CN 102253776 A * 11/2011
CN 203232392 U 10/2013
(Continued)

OTHER PUBLICATIONS

International Search Report and Written Opinion dated Mar. 29, 2016; PCT/CN2015091034.

*Primary Examiner* — Mark Edwards
(74) *Attorney, Agent, or Firm* — Ladas & Parry LLP

(57) ABSTRACT

A touch display device is provided. The touch display device comprises a display panel (5), the display panel (5) has a plurality of pixel units (3), each of the pixel units (3) includes a functional region (31), and a non-functional region (32) is formed between functional regions (31) of adjacent pixel units. The touch display device further comprises a plurality of lines of sensor units (1), and adjacent sensor units in each line of the sensor units are electrically connected with each other by a connection unit. The connection unit includes a connection bridge (21, 22), a projection of at least part of the connection bridge (21, 22) on a light emission surface of the display panel (5) is located in
(Continued)

the non-functional region (32) between the functional regions (31) of adjacent pixel units and extends in an extension direction of the non-functional region (32). A shadow dispelling effect of the connection bridge is improved, and display quality of the touch display device is improved.

15 Claims, 3 Drawing Sheets

(58) Field of Classification Search
USPC .......................................................... 345/174
See application file for complete search history.

(56) References Cited

U.S. PATENT DOCUMENTS

| | | | |
|---|---|---|---|
| 2015/0049030 A1* | 2/2015 | Her | G06F 3/0412 |
| | | | 345/173 |
| 2015/0109245 A1* | 4/2015 | Chou | G06F 3/044 |
| | | | 345/174 |
| 2015/0185048 A1* | 7/2015 | Liu | G01D 5/20 |
| | | | 345/174 |
| 2016/0124538 A1* | 5/2016 | Xiao | B05D 3/002 |
| | | | 345/173 |
| 2016/0259447 A1* | 9/2016 | Lin | G06F 3/044 |

FOREIGN PATENT DOCUMENTS

| | | |
|---|---|---|
| CN | 103995634 A | 8/2014 |
| CN | 10436170 A | 2/2015 |

* cited by examiner

TOUCH DISPLAY DEVICE

TECHNICAL FIELD

Embodiments of the present disclosure relate to a touch display device.

BACKGROUND

Touch display device generally comprises a touch panel and a display panel, and the touch panel is classified into an add-on mode touch panel, an on-cell mode touch panel and an in-cell mode touch panel. As for the on-cell mode touch panel, sensor units are arranged between an opposed substrate of the display panel and a polarizer corresponding to the opposed substrate. As for the in-cell mode touch panel, sensor units are arranged inside the display panel. The on-cell mode touch panel has advantages of high touch precision and the like, and therefore is quite popular.

Touch precision of the on-cell mode touch panel prepared through a Multi Layers on-cell (MLOC) technology is higher than that of the on-cell mode touch panel prepared through a Single Layer on-cell (SLOC) technology. Therefore, the on-cell mode touch panel prepared through the MLOC technology has become a main current selection of the touch panel adopted in a capacitive touch display device.

The on-cell mode touch panel comprises a plurality of columns of first sensor units and a plurality of rows of second sensor units. The plurality of columns of first sensor units cross with the plurality of rows of second sensor units. Two adjacent first sensor units in each column of the first sensor units are electrically connected with each other through a connection bridge, or two adjacent second sensor units in each row of the second sensor units are electrically connected with each other through the connection bridge.

Because the connection bridges are prepared from an opaque metal, it is hoped that the touch panel is designed so that a shadow dispelling effect of the connection bridges can be achieved, that is to say, the connection bridges do not appear on an image displayed on the touch display device. The shadow dispelling effect of the connection bridges directly affects performance of the touch panel and then affects a display effect of the touch display device.

SUMMARY

A touch display device is provided. The touch display device comprises a display panel, the display panel has a plurality of pixel units, each of the pixel units includes a functional region, and a non-functional region is formed between functional regions of adjacent pixel units. The touch display device further comprises a plurality of lines of sensor units, and adjacent sensor units in each line of the sensor units are electrically connected with each other by a connection unit. The connection unit includes a connection bridge, a projection of at least part of the connection bridge on a light emission surface of the display panel is located in the non-functional region between the functional regions of adjacent pixel units and extends in an extension direction of the non-functional region.

For example, in each line of the sensor units, the side edge of each sensor unit is in a zigzag shape.

For example, the plurality of lines of the sensor units include a plurality of columns of first sensor units and a plurality of rows of second sensor units; and the first sensor units in each column of the first sensor units are arranged in a first direction, the second sensor units in each row of the second sensor units are arranged in a second direction, and the first direction and the second direction cross with each other.

For example, the connection unit further includes a connection part, and the connection part and the sensor units are arranged in a same layer and disconnected from each other; the connection bridge includes a first connection bridge and a second connection bridge; and for adjacent sensor units in each line of the sensor units, one sensor unit is connected to the connection part through the first connection bridge, and the other sensor unit is connected to the connection part through the second connection bridge.

For example, the display panel is a liquid crystal display panel, the functional region of each pixel unit is a display region of the pixel unit, and the non-functional region between the functional regions of adjacent pixel units is a non-display region between adjacent display regions.

For example, the display panel is an organic electroluminescence display panel, the functional region of each pixel unit is a light emission region, and the non-functional region between the functional regions of adjacent pixel units is a non-light emission region.

For example, the display panel is of a rectangular shape, the first direction is parallel with a transverse or longitudinal side edge of the display panel, and the second direction is parallel with the longitudinal or transverse side edge of the display panel.

For example, the connection bridge is of a linear shape or a zigzag shape.

For example, in the case that the connection bridges is in the linear shape, an included angle between an extension direction of the connection bridge and the transverse or longitudinal side edge of the display panel is greater than 0° and less than 90°.

For example, in the case that the connection bridge is in the zigzag shape, an included angle between an extension direction of a straight part of the connection bridge and the transverse or longitudinal side edge of the display panel is greater than 0° and less than 90°.

For example, the connection bridge is made from a metal material.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

The technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Figure 1:
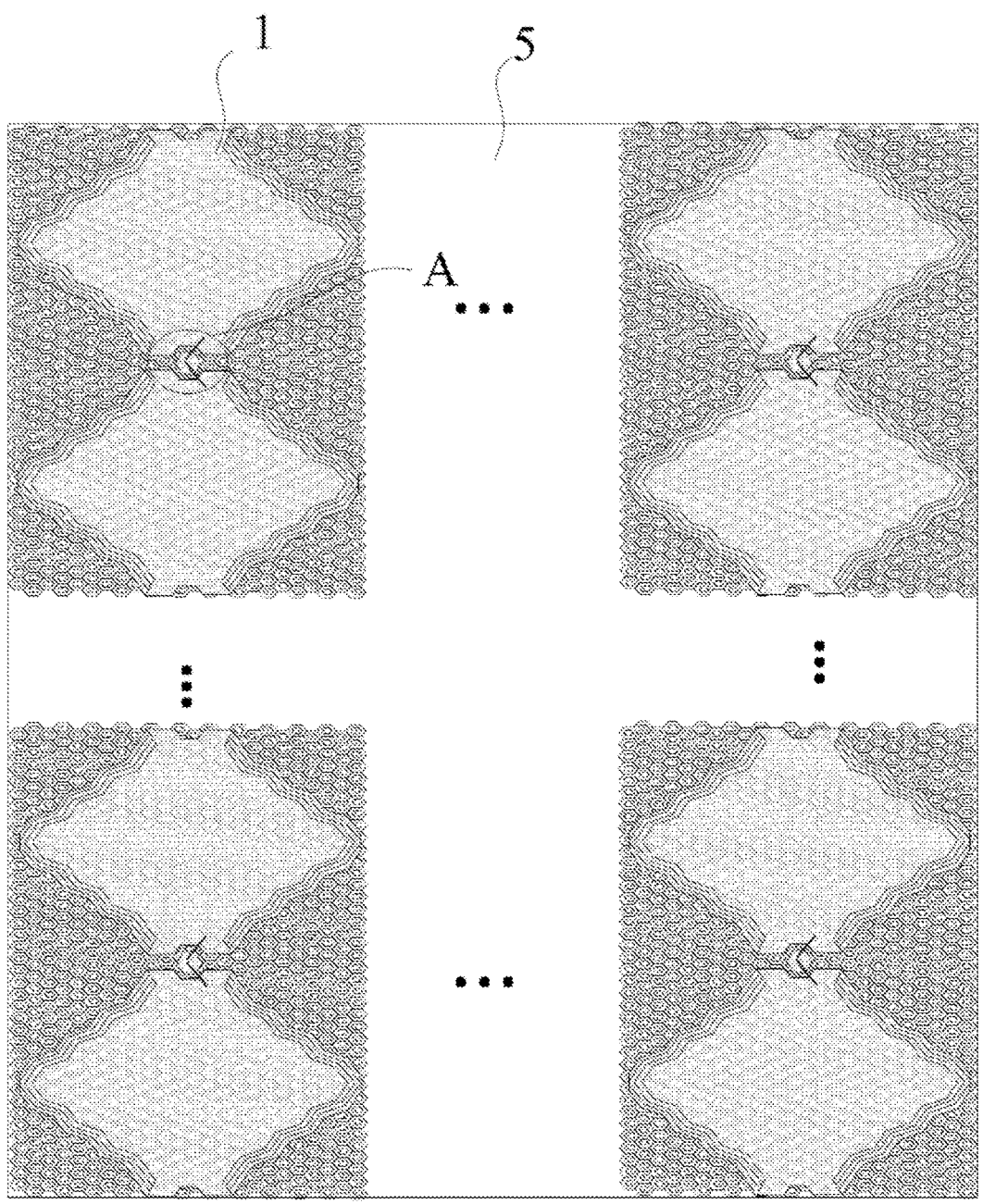
FIG. 1 is a structural schematic view illustrating a touch display device according to embodiments of the present disclosure.

Embodiments of the present disclosure provide a touch display device. Please refer to FIG. 1 and FIG. 2, the touch display device comprises a display panel 5, the display panel 5 has a plurality of pixel units 3, each pixel unit 3 includes a functional region 31, and a non-functional region 32 is formed between functional regions 31 of adjacent pixel units 3. The touch display device further comprises a plurality of lines of sensor units 1, and adjacent sensor units (such as the adjacent sensor unit 11 and sensor unit 12 shown in FIG. 2) in each line of sensor units 1 are electrically connected with each other by a connection unit; the connection unit includes a connection bridge (such as the connection bridge 21 and the connection bridge 22 shown in FIG. 2), a projection of at least part of at least one connection bridge on a light emission surface of the display panel 5 is located in the non-functional region 32 between the functional regions 31 of adjacent pixel units 3 and extends in an extension direction of the non-functional region 32.

In the touch display device, in the case that the projection of at least part of the connection bridge on the light emission surface of the display panel 5 is located in the non-functional region 32 between the functional regions 31 of adjacent pixel units 3 and extends in the extension direction of the non-functional region 32, this part of the connection bridge will not affect an image displayed by the functional regions 31 of the pixel units 3, influences of the connection bridge on the image displayed by the touch display device are reduced, and therefore a shadow dispelling effect of the connection bridge is improved, and display quality of the touch display device is improved.

Figure 3:
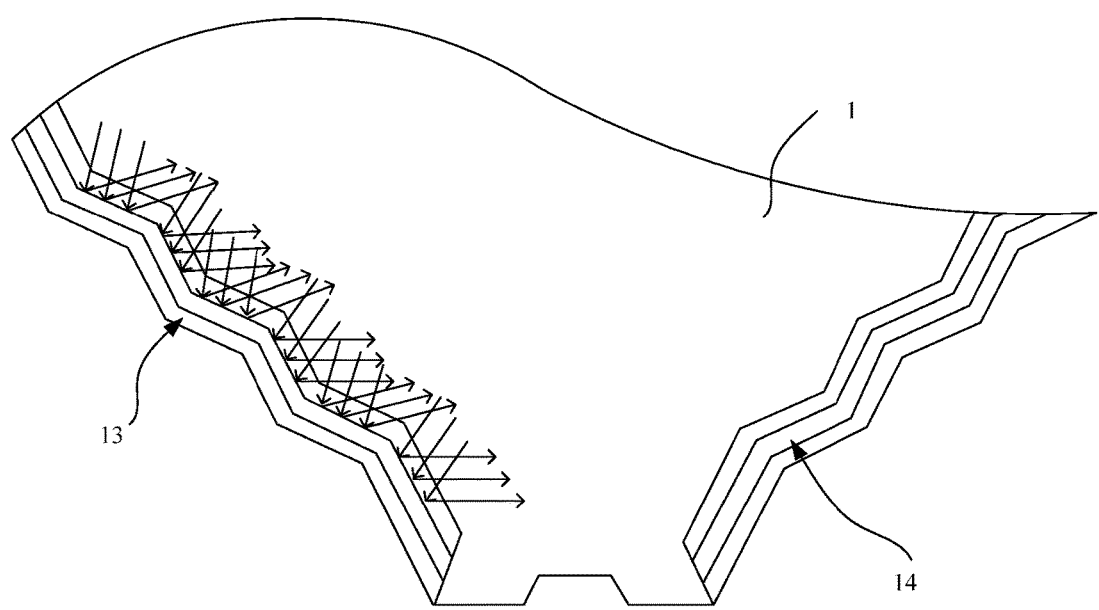
FIG. 3 is a structural schematic view illustrating a sensor unit in the touch display device according to the embodiments of the present disclosure.

For example, as shown in FIG. 3, the side edge of the sensor unit 1 is in a zigzag shape, such as the side edge 13 and the side edge 14 of the sensor unit 1. Taking the side edge 13 of the sensor unit 1 as an example, because the side edge 13 of the sensor unit 1 is in the zigzag shape, light reflected by the side edge 13 of the sensor unit 1 is in disorder, the light reflected by the side edge 13 of the sensor unit 1 can not be concentrated in a specific direction, visibility of the side edge 13 of the sensor unit 1 is reduced, and the shadow dispelling effect of the side edge 13 of the sensor unit 1 is further improved. Because influences of the side edge 13 on the image displayed by the touch display device are reduced, the display effect of the touch display device is further improved.

For example, the plurality of lines of sensor units comprise a plurality of columns of first sensor units and a plurality of rows of second sensor units, the first sensor units in each column of the first sensor units are arranged in a first direction, the second sensor units in each row of the second sensor units are arranged in a second direction, the first direction and the second direction cross with each other. For example, the first direction is perpendicular to the second direction.

Next, the description is made with the sensor unit 11 and the sensor unit 12 which are adjacent to each other as an example. For example, the connection unit between the sensor unit 11 and the sensor unit 12 which are adjacent to each other includes a first connection bridge 21, a second connection bridge 22 and a connection part 4. The connection part 4, the sensor unit 11 and the sensor unit 12 are arranged in a same layer and are disconnected from each other, the connection part 4 and the sensor unit 11 are electrically connected with each other by at least one first connection bridge 21, and the connection part 4 and the sensor unit 12 are electrically connected with each other by at least one second connection bridge 22. Thus, the sensor unit 11 is connected to the sensor unit 12 by the first connection bridge 21, the connection part 4 and the second connection bridge 22. For example, projections of both ends of the first connection bridge 21 and both ends of the second connection bridge 22 on the light emission surface of the display panel 5 are located in the non-functional region 32 between the functional regions 31 of adjacent pixel units 3, and only projections of a middle portion of the first connection bridge 21 and a middle portion of the second connection bridge 22 on the light emission surface of the display panel 5 are located in the functional regions 31 of the pixel units 3. Thus, shielding of the connection bridge 21 and the connection bridge 22 on the functional region 31 of the pixel units 3 can be reduced, and the display effect of the touch display device is improved.

For example, the sensor unit 1 and the connection part 4 are made from a transparent conductive material such as ITO. For example, the connection bridge is formed by a metal material such as Mo, Al, Cu and the like.

For example, the touch display device further comprises an insulating layer which covers the sensor unit 1 and the connection part 4, and the connection bridge is formed on the insulating layer; a plurality of via holes 23 are formed in the insulating layer. For example, one end of the connection bridge is connected to the sensor unit 11 through the via hole 23, the other end of the connection bridge is connected to the sensor unit 12 through the via hole 23, and therefore the sensor unit 11 and the sensor unit 12 which are adjacent to each other are connected with each other. For example, one end of the connection bridge is connected to the sensor unit 11 through several via holes 23, the other end of the connection bridge is connected to the sensor unit 12 through several via holes 23, and therefore connection stability are increased.

Figure 2:
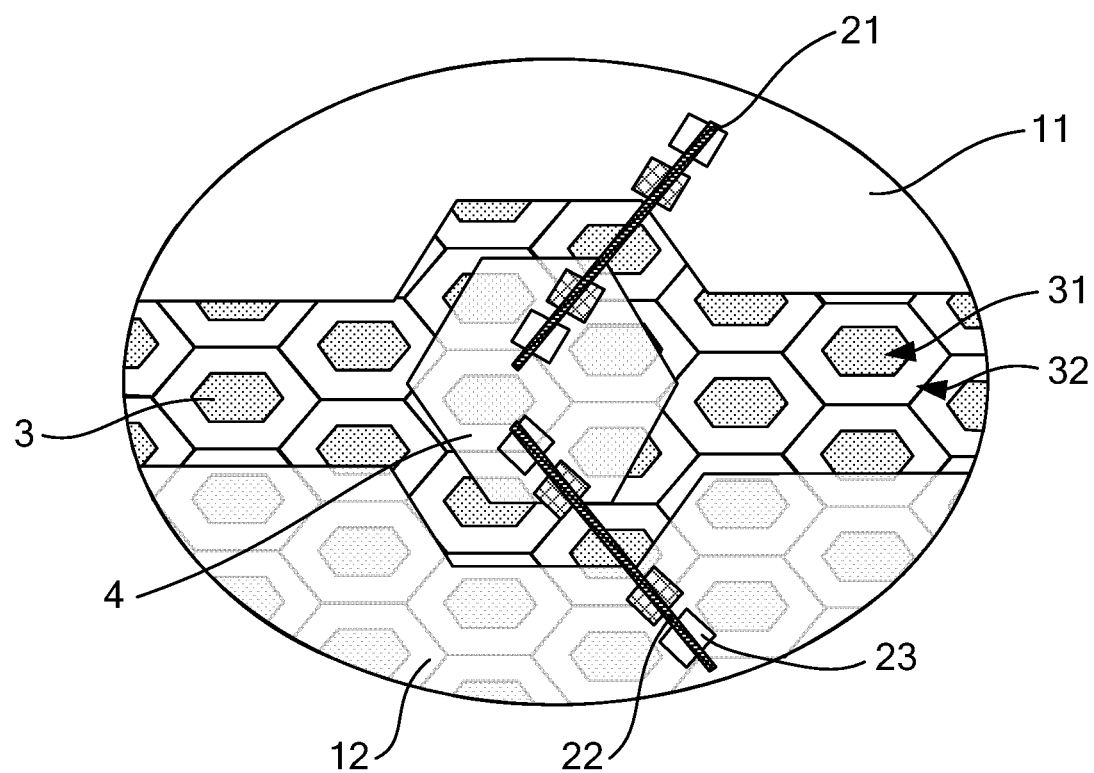
FIG. 2 is a partial enlarged view of an A portion in FIG. 1.

For example, as shown in FIG. 2, one end of the first connection bridge 21 is connected to the sensor unit 11 through the via hole 23, and the other end of the first connection bridge 21 is connected to the connection part 4 through the via hole 23; one end of the second connection bridge 22 is connected to the sensor unit 12 through the via hole 23, and the other end of the second connection bridge 22 is connected to the connection part 4 through the via hole 23. Thus, the sensor unit 11 and the sensor unit 12 which are adjacent to each other are connected with each other.

For example, as shown in FIG. 2, one end of the first connection bridge 21 is connected to the sensor unit 11 through several via holes 23, and therefore the connection stability is increased. Similarly, the other end of the first connection bridge 21 is connected to the connection part 4 through several via holes 23; one end of the second connection bridge 22 is connected to the sensor unit 12 through several via holes 23, and the other end of the second connection bridge 22 is connected to the connection part 4 through several via holes 23.

It should be noted that, in FIG. 2, the pixel unit 3 is hexagonal. However, the embodiments of the present disclosure are not limited thereto, the pixel units 3 may be in other appropriate shapes such as a quadrangle.

For example, the display panel of the touch display device is of multiple structures, for instance:

Structure I: the display panel is a liquid crystal display panel; in such case, the functional region 31 of each pixel unit 3 is a display region of the pixel unit, and the non-functional region 32 between the functional regions 31 of adjacent pixel units 3 is a non-display region between two display regions.

Structure II: the display panel is an organic electroluminescence display panel; in such case, the functional region 31 of each pixel unit 3 is a light emission region, and the non-functional region 32 between the functional regions 31 of adjacent pixel units 3 is a non-light emission region.

For example, the display panel 5 of the touch display device is of a rectangular shape, the first direction is parallel with a transverse or longitudinal side edge of the display panel 5, and the second direction is parallel with the longitudinal or transverse side edge of the display panel 5.

For example, the connection bridge of the connection unit between adjacent sensor units in each line of sensor units is of a linear shape or a zigzag shape.

Because of visual characteristics of human eyes, a recognition degree of human eyes on a inclined pattern is lower than the recognition degree of human eyes on a horizontal or vertical pattern, and thus, in order to reduce the recognition degree of human eyes on the connection bridge and then improve the display effect of the display device, the connection bridge is not arranged in the horizontal or vertical direction. For example, in the case that the connection bridge is in the linear shape, an included angle between an extension direction of the connection bridge and the transverse or longitudinal side edge of the display panel 5 is greater than 0° and smaller than 90°.

For example, in the case that the connection bridge is in the zigzag shape, the included angle between an extension direction of a straight part of the connection bridge and the transverse or longitudinal side edge of the display panel 5 is greater than 0° and smaller than 90°.

The foregoing embodiments merely are exemplary embodiments of the disclosure, and not intended to define the scope of the disclosure, and the scope of the disclosure is determined by the appended claims.

The present application claims priority of Chinese Patent Application No. 201520451318.1 filed on Jun. 26, 2015, the present disclosure of which is incorporated herein by reference in its entirety as part of the present application.

The invention claimed is:

1. A touch display device, comprising a display panel, the display panel having a plurality of pixel units, each of the pixel units including a display region, and a non display region being formed between display regions of adjacent pixel units; the touch display device further comprising a plurality of lines of sensor units, and adjacent sensor units in each line of the sensor units being electrically connected with each other by a connection unit, wherein,
the connection unit includes a connection bridge, the connection bridge comprises two end portions and a middle portion provided between the two end portions;
only projections of the two end portions of the connection bridge on a light emission surface of the display panel respectively are located in the non display region between the display regions of adjacent pixel units, and an entirety of each of the projections of the two end portions of the connection bridge on the light emission surface of the display panel extends in an extension direction of the non display region, and has an extension direction coinciding with an extension direction of the connection bridge; and
an entirety of a projection of the middle portion of the connection bridge on the light emission surface of the display panel is located in the display region.

2. The touch display device according to claim 1, wherein, in each line of the sensor units, the side edge of each sensor unit is in a zigzag shape.

3. The touch display device according to claim 1, wherein, the plurality of lines of the sensor units include a plurality of columns of first sensor units and a plurality of rows of second sensor units; and
the first sensor units in each column of the first sensor units are arranged in a first direction, the second sensor units in each row of the second sensor units are arranged in a second direction, and the first direction and the second direction cross with each other.

4. The touch display device according to claim 1, wherein, the connection unit further includes a connection part, and the connection part and the sensor units are arranged in a same layer and disconnected from each other;
the connection bridge includes a first connection bridge and a second connection bridge; and
for adjacent sensor units in each line of the sensor units, one sensor unit is connected to the connection part through the first connection bridge, and the other sensor unit is connected to the connection part through the second connection bridge.

5. The touch display device according to claim 1, wherein, the display panel is a liquid crystal display panel.

6. The touch display device according to claim 1, wherein, the display panel is an organic electroluminescence display panel.

7. The touch display device according to claim 3, wherein, the display panel is of a rectangular shape, the first direction is parallel with a transverse or longitudinal side edge of the display panel, and the second direction is parallel with the longitudinal or transverse side edge of the display panel.

8. The touch display device according to claim 7, wherein, the connection bridge is of a linear shape or a zigzag shape.

9. The touch display device according to claim 8, wherein, in the case that the connection bridge is in the linear shape, an included angle between an extension direction of the connection bridge and the transverse or longitudinal side edge of the display panel is greater than 0° and less than 90°.

10. The touch display device according to claim 8, wherein, in the case that the connection bridge is in the zigzag shape, an included angle between an extension direction of a straight part of the connection bridge and the transverse or longitudinal side edge of the display panel is greater than 0° and less than 90°.

11. The touch display device according to claim 1, wherein, the connection bridge is made from a metal material.

12. The touch display device according to claim 1, wherein, the sensor units are made of a transparent conductive material.

13. The touch display device according to claim 4, wherein, the sensor units and the connection part are made of a transparent conductive material.

14. The touch display device according to claim 4, wherein, the connection part is provided outside of an outer edge of each of the sensor units.

15. The touch display device according to claim 4, wherein, for the adjacent sensor units in each line of the sensor units, a connection between the one sensor unit and the first connection bridge, a connection between the connection part and the first connection bridge, a connection between the other sensor unit and the second connection bridge, and a connection between the connection part and the second connection bridge are respectively by a plurality of via holes.

* * * * *